US008135952B2

(12) United States Patent
Bretheim

(10) Patent No.: US 8,135,952 B2
(45) Date of Patent: Mar. 13, 2012

(54) METHOD AND SYSTEM FOR SECURE POSITION DETERMINATION

(75) Inventor: Sam A. Bretheim, Great Falls, MT (US)

(73) Assignee: Recursion Ventures LLC, Brooklyn, NY (US)

( * ) Notice: Subject to any disclaimer, the term of this patent is extended or adjusted under 35 U.S.C. 154(b) by 1157 days.

(21) Appl. No.: 11/869,472

(22) Filed: Oct. 9, 2007

(65) Prior Publication Data

US 2008/0250243 A1      Oct. 9, 2008

Related U.S. Application Data

(60) Provisional application No. 60/828,869, filed on Oct. 10, 2006.

(51) Int. Cl.
    *H04L 29/06* (2006.01)
(52) U.S. Cl. ........................................................ 713/168
(58) Field of Classification Search .................. 713/150, 713/153, 168, 169
    See application file for complete search history.

(56) References Cited

U.S. PATENT DOCUMENTS

| 4,606,015 | A | * | 8/1986 | Yamaguchi | 367/95 |
| 5,699,348 | A | * | 12/1997 | Baidon et al. | 370/242 |
| 6,282,165 | B1 | * | 8/2001 | Koyama et al. | 369/118 |
| 2003/0065918 | A1 | * | 4/2003 | Willey | 713/168 |
| 2003/0174048 | A1 | * | 9/2003 | McCorkle | 340/10.34 |
| 2004/0059914 | A1 | * | 3/2004 | Karaoguz | 713/168 |
| 2005/0135495 | A1 | * | 6/2005 | Barak et al. | 375/260 |
| 2005/0265503 | A1 | * | 12/2005 | Rofheart et al. | 375/354 |
| 2005/0273608 | A1 | * | 12/2005 | Kamperman | 713/169 |
| 2008/0169904 | A1 | * | 7/2008 | Schulman et al. | 340/7.22 |
| 2009/0217037 | A1 | * | 8/2009 | Courtay et al. | 713/168 |

OTHER PUBLICATIONS

"ROPE: Robust Position Estimation in Wireless Sensor Networks", Proceedings of the Fourth International Symposium on Information Processing in Sensor Networks, 2005.*
Sam Bretheim, Cryptographic Authentication of Navigation Protocols [online], Oct. 9, 2005 [retrieved Jan. 9, 2008], retrieved from Internet <URL: http://arxiv.org/abs/cs/0510022 > (12 pages).

* cited by examiner

*Primary Examiner* — Edward Zee
*Assistant Examiner* — John B King
(74) *Attorney, Agent, or Firm* — Nadya Reingand

(57) ABSTRACT

A system and method of security for navigation, positioning, and localization systems, and applications of cryptography thereto are provided. The security can be applied to navigation, aircraft landing guidance, air traffic control, location-based access control, the prevention of relay attacks against financial and legal transaction protocols and protection of other data transmissions.

17 Claims, 6 Drawing Sheets

METHOD AND SYSTEM FOR SECURE POSITION DETERMINATION

This application claims the benefit of U.S. Provisional Application No. 60/828,869, filed Oct. 10, 2006, the entire disclosure of which is incorporated herein by reference.

BACKGROUND OF THE INVENTION

1. Field of the Invention

The present invention pertains to security for navigation, positioning, and localization systems, and applications of cryptography thereto. The security can be applied to navigation, aircraft landing guidance, air traffic control, location-based access control, the prevention of relay attacks against financial and legal transaction protocols and protection of other data transmissions.

2. Description of the State of the Art

The general notion of positioning by distance and direction predates humanity. Radar and sonar, developed around the time of World War II, were the first human techniques that calculated distance by measuring the time of flight of a signal and combined distance and direction to give relative position; lidar systems later applied the same concept to the optical spectrum. The first combined distance-direction technology designed specifically for positioning and navigation was VHF Omnidirectional Range/Distance Measuring Equipment (VOR/DME), deployed from 1948 to the present. Tactical Air Navigation (TACAN), an improved military version of VOR/DME using essentially the same methods, was built out in the early 1950s. Secondary surveillance radar, also known as Air Traffic Control Radio Beacon System (ATCRBS), introduced in the late 1950s, was an important refinement. Most direction-measurement protocols measure horizontal (azimuth) angle; the glide-slope indicator component of instrument Landing Systems (ILS), introduced in the 1940s, added rough indication of vertical (elevation) angle, and Microwave Landing Systems (MLS), introduced in the 1980s, added precise measurement of elevation angle.

Identification Friend or Foe (IFF) interrogators and transponders built into some aircraft during and after World War II were distance-angle radiolocation systems with rudimentary security mechanisms. Cryptographic security was first added to IFF in IFF Mark XII, a.k.a. Mode 4, in the 1960s, which provides only imprecise distance/angle information and is intended to identify aircraft that are located using radar or other means; Mark XII also provides little protection against relay attacks. Mark XIIA, a.k.a. Mode 5, introduced in the 2000s, features improved transmission security and message security, but it identifies aircraft rather than locating the aircraft, and it appears not to use precise timing for distance bounding.

Secure distance bounding was first proposed in the academic literature by Beth et al., "Identification tokens, or: Solving the chess grandmaster problem", Advances in Cryptology—Crypto '90, 1990, as a solution to relay attacks against cryptographic zero-knowledge authentication protocols; distance bounding was concretely described by Brands et al., "Distance-Bounding Protocols (Extended Abstract)", Advances in Cryptology—Eurocrypt '93, 1993. U.S. Pat. No. 5,659,617 and its successor RE38,899 describe a method intended to provide security for radiolocation based on distance bounding.

Global Positioning System (GPS), the most common radionavigation system in use as of 2006, was developed by the U.S. military in the 1980s, and was the first widespread passive time-of-arrival navigation to include cryptographic security. The present generation of satellites offers two security mechanisms: Selective Availability adds a pseudorandom uncertainty to each satellite's range data, with the intent of denying high-resolution positioning information to unauthorized users; Anti-Spoofing additively encrypts the GPS precise positioning signal with a lower-frequency pseudorandom sequence, with the intent to both deny unauthorized use of that signal and to make spoofing of the signal difficult.

There has been a suggestion to protect positioning schemes based on simple directional receivability, received signal strength, or signal-to-noise ratio; however this does not provide the same security guarantee as time-of-flight techniques. The combination of secure distance bounding and direction-based positioning is described in Robust Position Estimation (ROPE), by Lazos et al., "ROPE: Robust Position Estimation in Wireless Sensor Networks", Proceedings of the Fourth International Symposium on Information Processing in Sensor Networks (IPSN 2005), 2005.

Transmitting position messages with cryptographic protection was described in U.S. Pat. No. 4,077,005, and further described in association with the use of public-key algorithms in Desmedt, "Major security problems with the 'unforgeable' (Feige-) Fiat-Shamir proofs of identity and how to overcome them", Proceedings of SecuriCom '88, 1988, and the aforementioned U.S. Pat. No. 5,659,617 and RE 38,899.

Passive time-of-flight navigation methods (e.g., those methods in which the node seeking to determine its position is a receiver only, such as GPS systems) are inherently vulnerable to several damaging relay attacks. Active methods not involving distance bounding are similarly vulnerable. Due to the hard minimum signal propagation time set by the speed of light, distance bounding offers a stronger proof of security. Using signal time of flight alone for secure positioning requires that at least three well-spaced non-collinear beacons be receivable from each point at which a node might need to be located. The combination of distance bounding and direction-based positioning can offer a degree of security that is unavailable with other positioning schemes that use a comparable number of nodes.

Navigation, proximity determination, and time synchronization are critical to numerous industrial and governmental activities. It is beneficial to provide such systems with security against position falsification ("spoofing") and other forms of electronic attack.

Therefore, what is needed is a method and/or system to add provable cryptographic security to navigation and time-transfer protocols. There is also needed a method and/or system for decoupling time-dependent ranging messages from cryptographic algorithms responsible for security, in order to enable the use of pubic-key cryptographic functions. Furthermore, there is a need to add cryptographic security to direction-based navigation protocols. There is yet a further need for such methods and/or systems of cryptographic security that are efficient and cost-effective. The present invention satisfies these and other needs.

BRIEF SUMMARY OF THE INVENTION

Briefly and in general terms, the present invention is directed to methods and systems for determining position relative to an object.

In aspects of the present invention, a method for determining position relative to an object comprises generating at least one challenge message, transmitting said at least one challenge message via a transmission transducer system to said object, receiving at least one response message via a reception transducer system, wherein said at least one response message comprises encoded information or authentication information, wherein said authentication information comprises at least one of an identity of said object, a response message content, a position of said object, a direction of said transmission transducer system, a gain pattern of said transmission transducer system, a time of transmission of said at least one response message, and a time of receipt of said at least one challenge message, determining whether said encoded information is cryptographically derived from said at least one challenge message and rejecting said at least one response message if said encoded information is not cryptographically derived from said challenge message, determining whether said authentication information was sent by said object and accepting said at least one response message if said authentication information was sent by said object, determining a time differential between a time of transmission of said at least one challenge message and a time of receipt of said at least one response message, determining an adjusted time measurement by subtracting a processing delay time from said time differential, determining a maximum distance to said object based at least in part on one or more of said adjusted time measurement, a speed of propagation of said at least one challenge message and a speed of propagation of said at least one response message, determining at least one of a direction of transmission of said at least one challenge message and a direction of receipt of said at least one response message, wherein said direction of transmission or said direction of receipt is based at least in part on directionality of at least one of said transmission transducer system or said reception transducer system, and determining a position relative to said object based at least in part on said maximum distance to said object and at least one of said direction of transmission of said at least one challenge message and said direction of receipt of said at least one response message.

In other aspects of the present invention, a navigation system comprises a transmission transducer to transmit at least one challenge message, a reception transducer to receive at least one response message, said at least one response message comprising encoded information or authentication information, wherein said authentication information comprises at least one of an identity of said object, a response message content, a position of said object, a direction of said transmission transducer, a gain pattern of said transmission transducer, a time of transmission of said at least one response message, and a time of receipt of said at least one challenge message, and a microprocessor for determining whether said encoded information is cryptographically derived from said at least one challenge message and whether said authentication information was sent by said object, wherein said microprocessor determines a time differential between a time of transmission of said at least one challenge message and a time of receipt of said at least one response message, wherein said microprocessor determines an adjusted time measurement by subtracting a processing delay time from said time differential, wherein said microprocessor determines a maximum distance to said object based at least in part on one or more of said adjusted time measurement, a speed of propagation of said at least one challenge message and a speed of propagation of said at least one response message, wherein said microprocessor determines at least one of a direction of transmission of said at least one challenge message and a direction of receipt of said at least one response message, and wherein said microprocessor determines a position relative to said object based at least in part on said maximum distance to said object and at least one of said direction of transmission of said at least one challenge message and said direction of receipt of said at least one response message.

In further aspects of the present invention, a computer readable program is embodied in an article of manufacture comprising computer readable program instructions for determining a position relative to an object, said program comprises program instructions for causing a computer to determine whether encoded information is cryptographically derived from at least one challenge message and whether authentication information was sent by said object, program instructions for causing said computer to determine a time differential between a time of transmission of said at least one challenge message and a time of receipt of at least one response message, program instructions for causing said computer to determine an adjusted time measurement by subtracting a processing delay time from said time differential, program instructions for causing said computer to determine a maximum distance to said object based at least in part on one or more of said adjusted time measurement, a speed of propagation of said at least one challenge message and a speed of propagation of said at least one response message, program instructions for causing a computer to determine at least one of a direction of transmission of said at least one challenge message and a direction of receipt of said at least one response message, and program instructions for causing a computer to determine the position relative to said object based at least in part on said maximum distance to said object and at least one of said direction of transmission of said at least one challenge message and said direction of receipt of said at least one response message.

The features and advantages of the invention will be more readily understood from the following detailed description which should be read in conjunction with the accompanying drawings.

BRIEF DESCRIPTION OF THE DRAWINGS

There are shown in the drawings arrangements which are presently preferred, it being understood, however, that the invention is not limited to the precise arrangements and instrumentalities shown, wherein.

DETAILED DESCRIPTION OF THE INVENTION

The invention disclosed herein provides a method and a system for determining the relative positions of objects by measuring signal propagation time and direction. Additionally, the integrity and trustworthiness of the messages exchanged between the object during operation of the system and execution of the method is assured by cryptography. For example, an authentication key or encryption key may be provided so that only properly authenticated or encrypted messages are accepted.

With reference now to the various figures in which similar elements are identically numbered throughout, a description of the various arrangements of the present invention will now be provided. While the invention is disclosed in the context of a single arrangement, it will be appreciated that the invention can include numerous modifications from the preferred arrangement.

Figure 1:
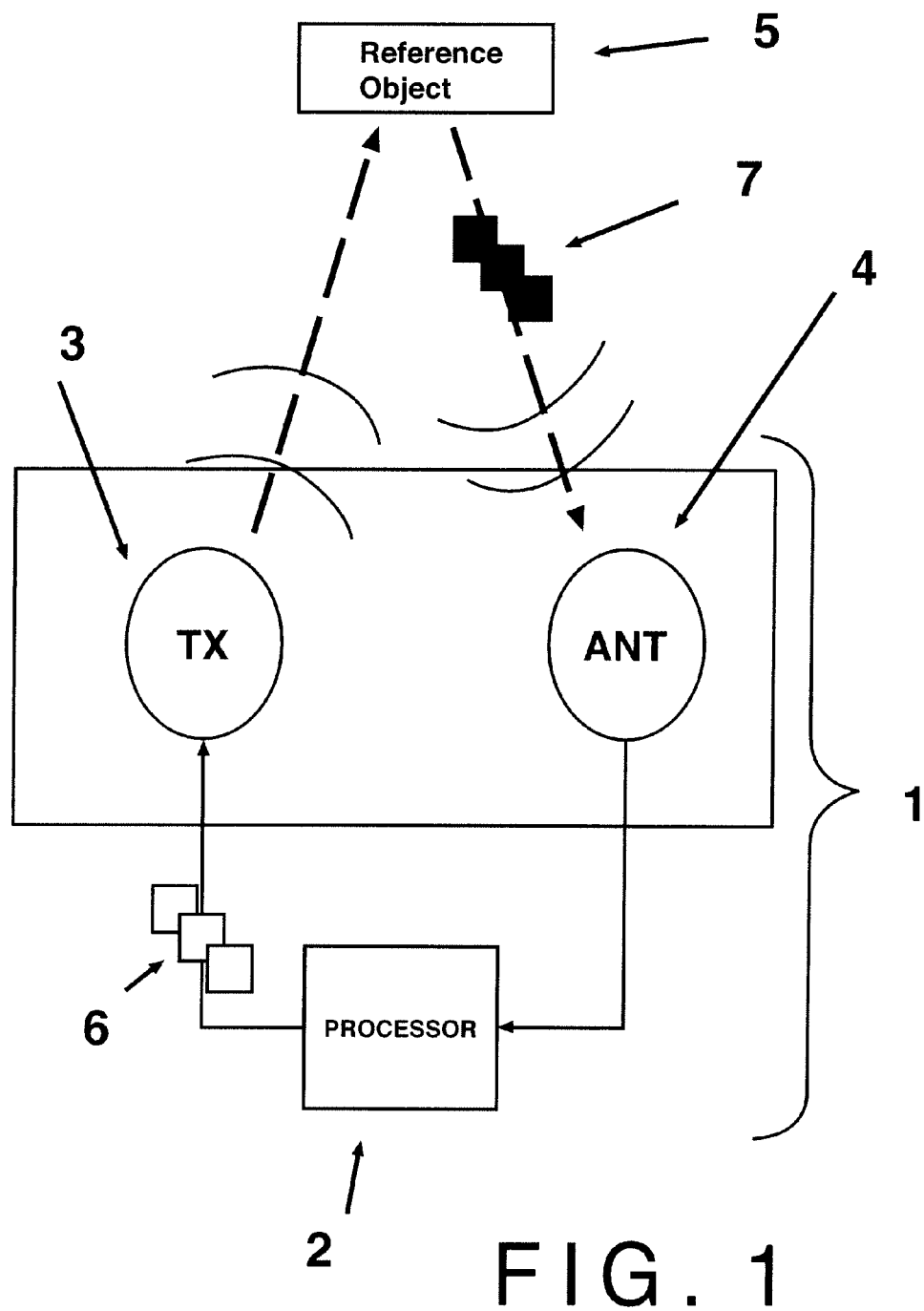
FIG. 1 is an exemplary schematic of a system in accordance with an arrangement of the invention.

With reference now to the figures, FIG. 1 depicts a pictorial representation of a local system or object 1 that wishes to ascertain its position in accordance with an arrangement of the invention. The local object 1 comprises of three main components: a processor 2, a transmission transducer system (TX) 3, and a reception transducer system (ANT) 4. In some arrangements, the local system 1 can be a component of an aircraft landing guidance system, and the directional transducer system can use components of an existing ILS (instrument landing system) localizer or glide-slope indicator transmission system. In other arrangements, the local object 1 or a remote object can comprise a land-based, marine, airborne, or space vehicle, a navigational aid, radar installation, or aircraft landing guidance system, an unattended ground sensor, or a tracking or navigation device carried by or attached to a person or other animal. In the depicted example, the processor 2 is coupled to, or in communication with, both the transmission transducer system 3 and the reception transducer system 4 to make the system operable. Additionally one or more reference systems or objects 5 are located within the transmission or receiving range of the local object 1, wherein the reference objects 5 can be similarly configured as the local object 1.

The most basic operation begins first with the processor 2 preparing one or more challenge messages 6 to be transmitted by the transmission transducer system 3. The challenge messages 6 may include authentication information and encrypted information. The challenge messages 6 are directed to the transmission transducer system 3 which subsequently transmits the challenge messages 6. The challenge messages 6 are then received by a reception transducer system of a reference object 5. Once the reference object 5 has processed the challenge messages 6, including decryption and/or authentication of the challenge messages 6, the reference system 5 can generate and transmit one or more response messages 7. The response messages 7 can include authentication information and encrypted information, such as identity information, response message content, position, transducer system direction, transducer system gain pattern, and time measurements. The response messages 7 are then received by the reception transducer system 4 of the system 1 and are directed to the processor 2. The processor 2 then analyzes the response messages 7, including decryption and authentication, and retrieves the information enclosed in the response messages 7. Finally, using the information in the response messages 7, the processor 2 calculates its position.

The processor 2 can have various components that allow the functions described herein to be performed. The particular algorithms and/or theory used for navigation and/or cryptography can be chosen to facilitate the methods and techniques described herein. There are no special computational requirements for a processor 2. For example, the processor 2 can use any cryptographic authentication means, including by way of example, not limitation, digital signatures, public-key encryption, or symmetric encryption algorithms.

In the various arrangements, the processor 2 can be configured to perform several computational operations. First, the processor 2 can be configured to determine whether encoded information is cryptographically derived from the challenge messages 6 and whether the authentication information was sent by the reference object 5. As used herein, "cryptographically derived from" means consisting in whole or in part of output of a cryptographic authentication function applied to the challenge messages 6. As used herein, "cryptographic authentication function" means a function whose output can be interpreted as a mathematical demonstration that the entity that generated a message is overwhelmingly likely to be in possession of a particular secret value. Second the processor 2 can be configured to determine a time differential between the time of transmission of the challenge messages 6 and the time of receipt of the response messages 7. Furthermore, the processor 2 can make an adjusted time measurement by subtracting a processing delay time from the time differential calculated. Third, the processor 2 can be configured to determine the maximum distance to the reference object 5, based at least on the adjusted time measurement and the speed of propagation of challenge messages 6 and the response messages 7. Fourth, the processor 2 can be configured to determine the direction of a reference object 5 by determining the direction of transmission of the challenge messages 6 or the direction of receipt of the response messages 6. As referenced throughout the specification, direction can be one or a combination of horizontal angle (azimuth), vertical angle (elevation), or diagonal angle. Finally, the processor 2 can be configured to determine the position of the local object 2 relative to the reference object 5 based at least in part on the calculated maximum distance and the direction to the reference object 5. While the exemplary embodiment above describes the steps in a particular order, the present disclosure contemplates various orders of steps being used, as well as simultaneous steps being taken.

As stated above, the transducer transmission system 3 and the reception transducer system 4 are coupled to the processor 2. Each system handles transmission and reception, respectively, and can be configured to be controlled by the processor 2 directly, although a separate system may be configured to control them. In some arrangements, the transmission transducer system 3 and the reception transducer system 4 may comprise a single system, or at least share common components.

In the various arrangements either or both the transmission transducer system 3 and the reception transducer system 4 can be directional systems, in which the included transducer can be aligned to transmit to or receive from a specific heading. However in other arrangements, such transducers may be omnidirectional. Similarly, a reference system 5 can also utilize an omnidirectional or directional transmission or reception transducer system. In some arrangements, the directionality of the reception transducer system 4 or transmission transducer system 3 of local system 1 is provided by an electronically-scanned antenna array that scans in a random or pseudorandom direction pattern. This is advantageous because an attacker capable of receiving signals from a region wider than the intended beam width will be unable to predict which interrogation corresponds to which direction.

In some arrangements, the transmission transducer system 3 or the reception transducer system can comprise of: a radio-frequency antenna system, an optical transducer system, or an acoustic transducer system. In other arrangements, transmission transducer system 4 can also be configured to transmit a challenge message or a response message as a pulse pattern by a primary radar system. Additionally, the transmission transducer system 3 can have the capability to transmit messages using ultra-wideband pulses, frequency hopping, or direct sequence spread spectrum. Although, the present disclosure contemplates other techniques being utilized for transmission of the messages. In other arrangements, the transmission transducer system 3 is capable of transmitting a main signal and a masking signal, whereby receivers outside the directional transmission pattern of the transmission transducer system 3 are prevented from receiving side lobes of the transmission pattern of the transmission transducer system 3.

Figure 2:
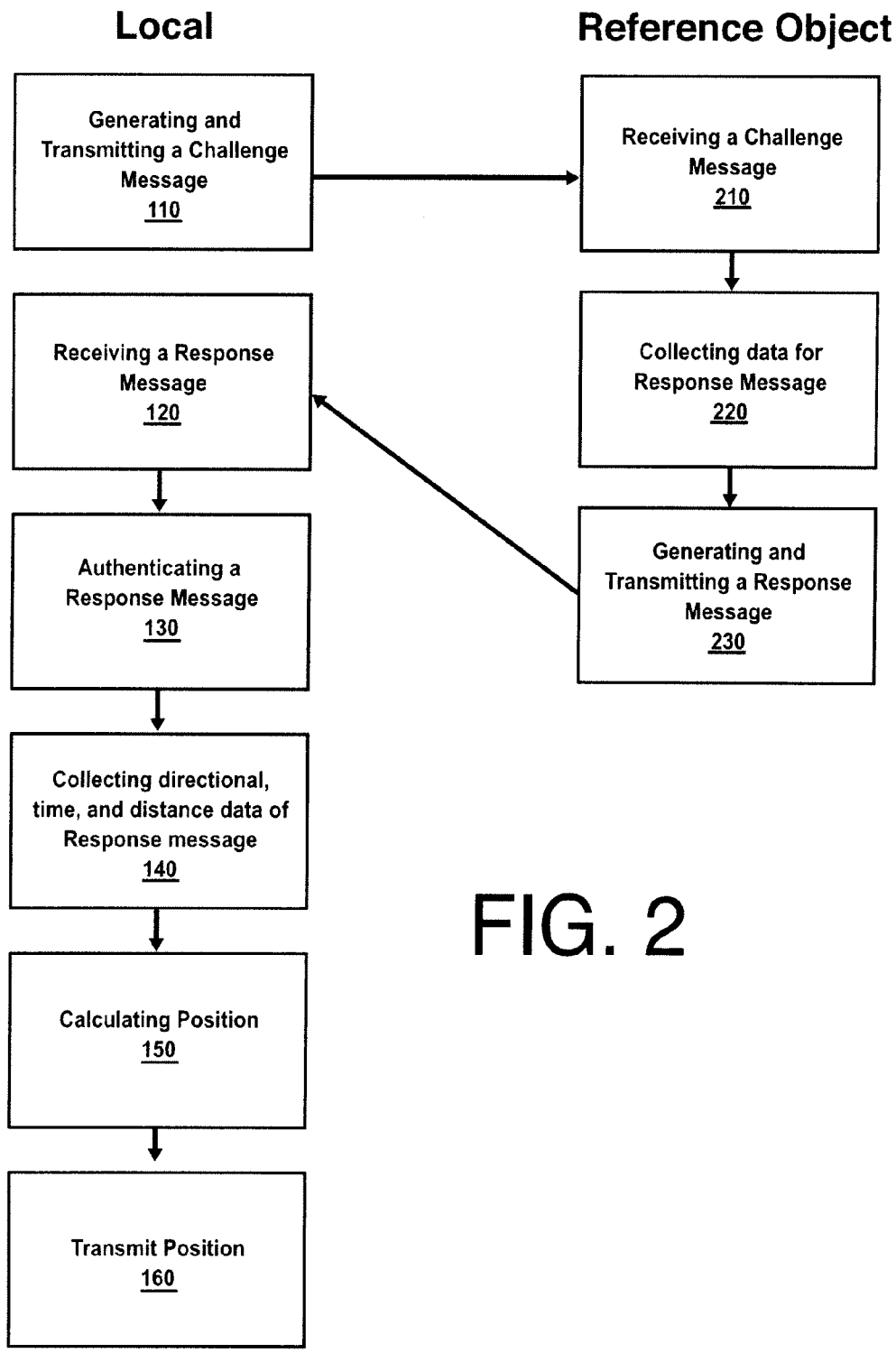
FIG. 2 is an exemplary flow diagram of a method in accordance with an arrangement of the invention.

FIG. 2 is a flowchart outlining an exemplary detailed operation of the present invention when determining the position of a local object 1 relative to a reference object 5. The steps shown in FIG. 2 are only exemplary steps may be optional or performed in a different order that that shown in FIG. 2 without departing from the spirit and scope of the present invention. No limitation is intended or should be inferred by the steps shown in FIG. 2.

As shown in FIG. 2, the operation starts with local object 1 first generating and transmitting a challenge message 6 (step 110), containing cryptographic information, via the transmission transducer system 3. A reference object 5 would then receive the challenge message (step 210). The reference object 5 would then collect reference object information to be included in a response message 7, including, but not limited to, information related to any or all of its identity, response message content, position, transducer system direction, transducer system gain pattern, and time measurements (step 220). The reference object 5 would then configure and transmit a response message (step 230), whereby the response message 7 contains, in addition to the reference object information, information cryptographically related to the challenge message 6 whereby the reference object 5 demonstrates knowledge of said challenge message 6.

The local object 1 would then receive the response message 7 via the reception transducer system 4 (step 120). The local object 1, using the processor 2, would then authenticate the response message (step 130). First the processor 2 determines whether the response message 7 contains cryptographic information that demonstrates knowledge of the challenge message 6 and determines its origin. Second, the processor determines by cryptographic means whether the authentication message was truly sent by the reference object 5. If either of these authentication steps fails, the response message 7 is rejected. Otherwise, the information from the reference object 7 is extracted and decrypted if necessary. The particular cryptographic techniques can be chosen to facilitate the efficiency and integrity of the system, as well as based upon other factors deemed significant to the system such as cost.

The processor 2 then collects local information regarding the local object 1 (step 140). First, the processor 2 determines the time between the transmission of the challenge message 6 and the receipt of the response message 7. The processor 2 can then subtract a known processing delay of reference object 5 to obtain an adjusted time measurement. The processor 2 can then calculate the maximum distance to the reference object 5 using the adjusted time measurement and the speed of propagation of the challenge message 6 and response message 7. Finally, the processor 2 can measure the direction or heading of the remote object 5, based on the direction of transmission of the challenge message 6 or the direction of arrival of the response message 7 by directionality measurement available in either the transmission transducer system 3 or the reception transducer system 4. The processor 2, can then compute the position of the local object 1 relative to the position of reference object 5, by using the measurements of maximum distance and direction of the remote object 5 (step 150).

Figure 3:
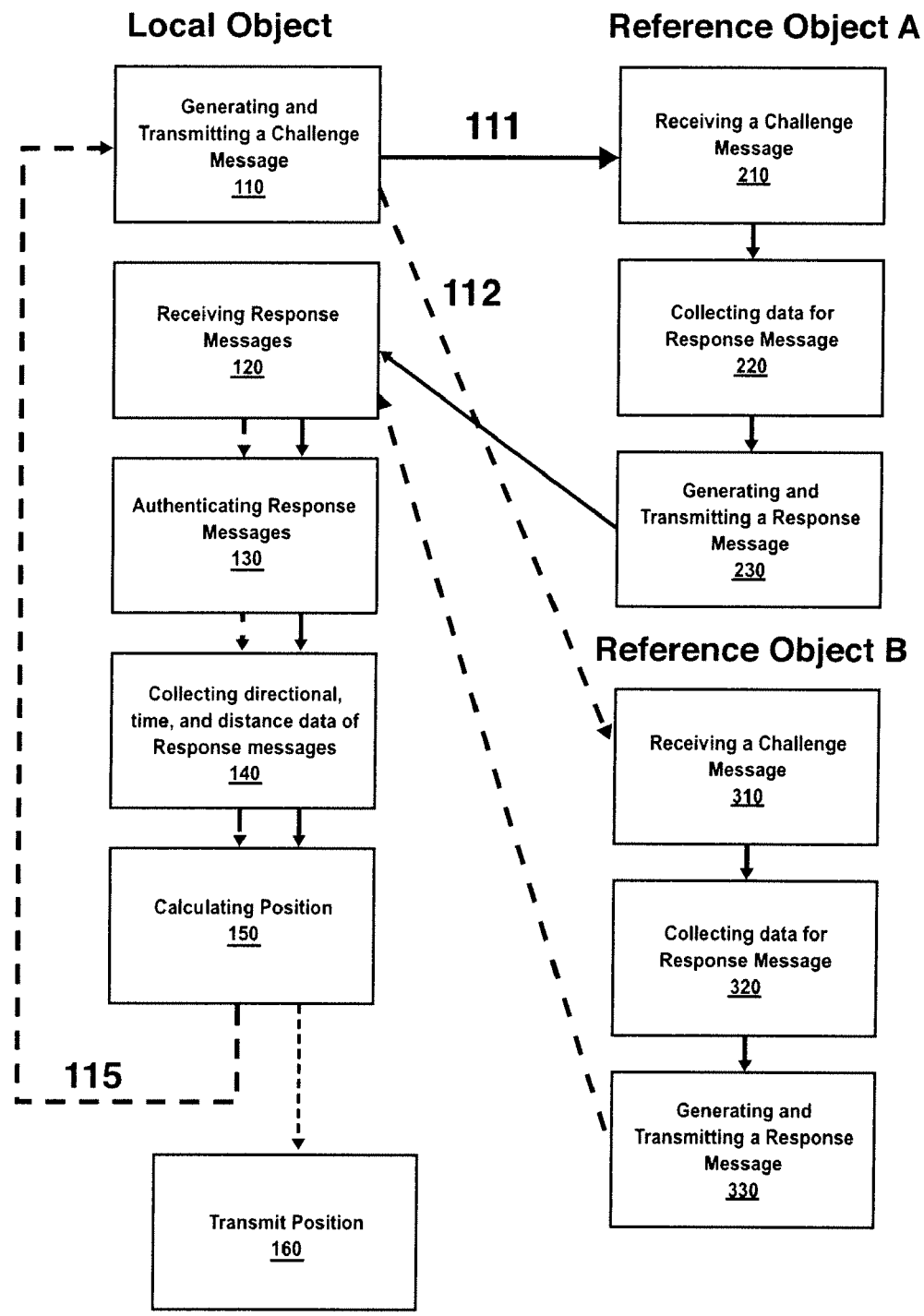
FIG. 3 is another exemplary flow diagram of a method in accordance with an arrangement of the invention.

FIG. 3 is a flowchart outlining an exemplary detailed operation of the present invention when determining the position of a local object 1 relative to one or more reference objects 5. It can be appreciated that such an arrangement allows a local object 1 to determine its position more accurately based on multiple references. In such an arrangement, the local object generates and transmits a challenge message 6 (step 110) as in FIG. 1, but now the challenge message 6 is received by a first reference object (step 210) and at least one additional reference object (step 310). Each reference object 5 then proceeds through the steps of collecting data for a response message 7 (steps 220, 320) and generates and transmits a response message 7 (steps 230, 330). The local object 1 then receives the response messages 7 (step 120) and processes and determines its position based on each response message 7 (steps 120-150). In some arrangements, the local object 1 may send challenge messages sequentially, first attempting to calculate its position relative to a first reference object by sending a challenge message 6 only to the first reference object (step 111), then looping back (step 155) before sending a challenge message 6 to a second reference object (step 112). In other arrangements, the challenge messages 6 (steps 111, 112) are sent concurrently and response messages 7 are processed concurrently or sequentially, depending on the configuration of the processor 2.

Figure 4:
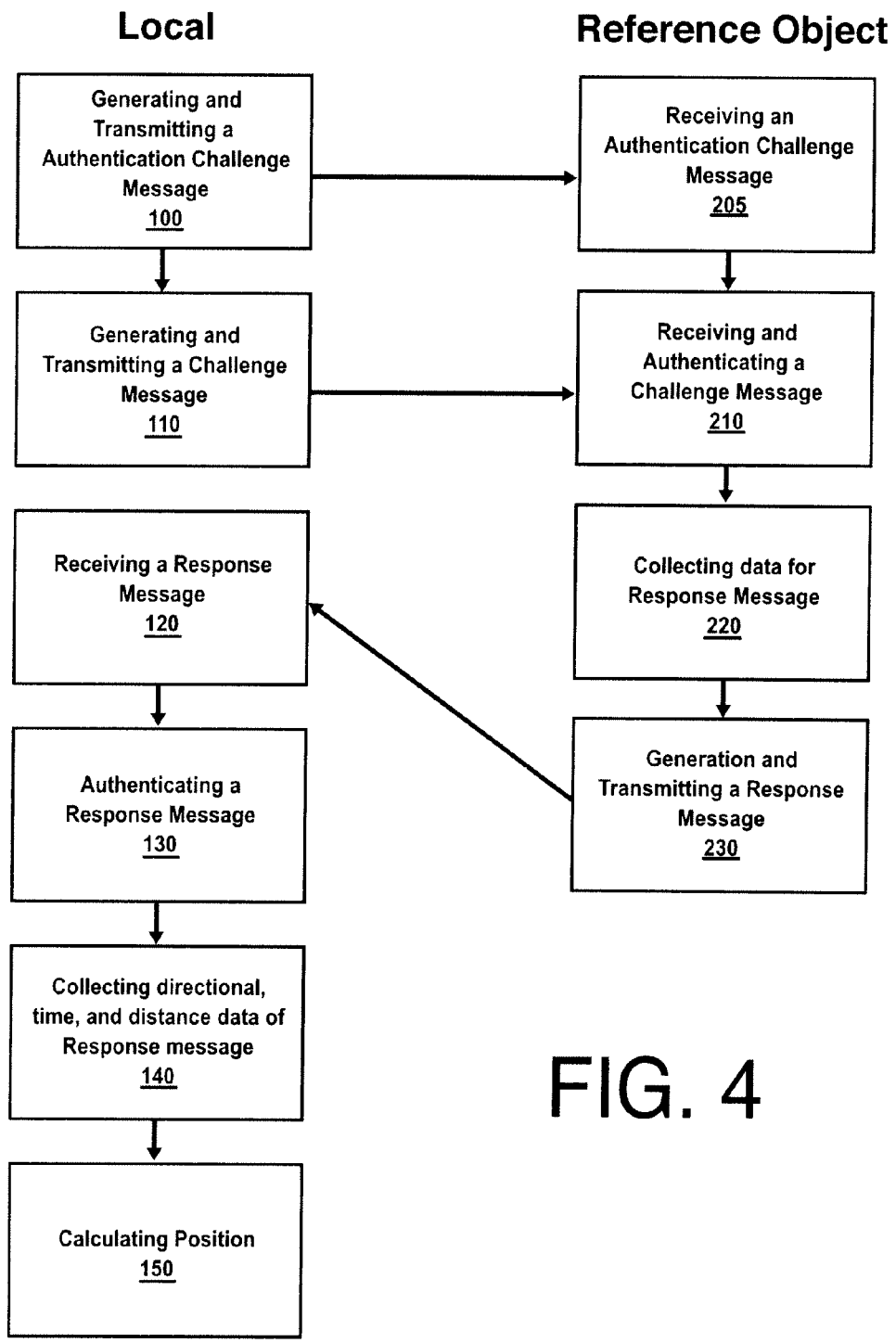
FIG. 4 is another exemplary flow diagram of a method in accordance with an arrangement of the invention.

FIG. 4 is a flowchart outlining an exemplary detailed operation of the present invention when determining the position of a local object 1 relative to a reference object 5, using an initial authentication challenge message. It can be appreciated that such an arrangement allows a local object 1 to send the required authentication and/or decryption information at the beginning of an exchange of challenge messages 6 and response messages 7, without having to resend the information throughout the length of the exchange. Such an arrangement decreases delay time between challenge messages 6 and response messages 7, allowing for increased accuracy in determining position. In such an arrangement, the local object 1 generates and transmits an authentication challenge message (step 100). This message can include all the necessary authentication and decryption information needed by the reference object 5 to accept and decode the challenge messages 6. The reference object 5 then receives the authentication challenge message (step 205). The local object 1 then sends at least one other challenge message 6 which is authenticated and decrypted by the reference object (step 210). However, if the challenge 6 message cannot be authenticated according to the authentication challenge message, the challenge message 6 is rejected by the reference object 5. Otherwise, the reference object 5 continues with collecting information, and generating and transmitting a response message 7 (steps 220, 230). The local object 1 then processes the response message 7 as discussed above in FIG. 1 and calculates its position (steps 120-150).

Figure 5:
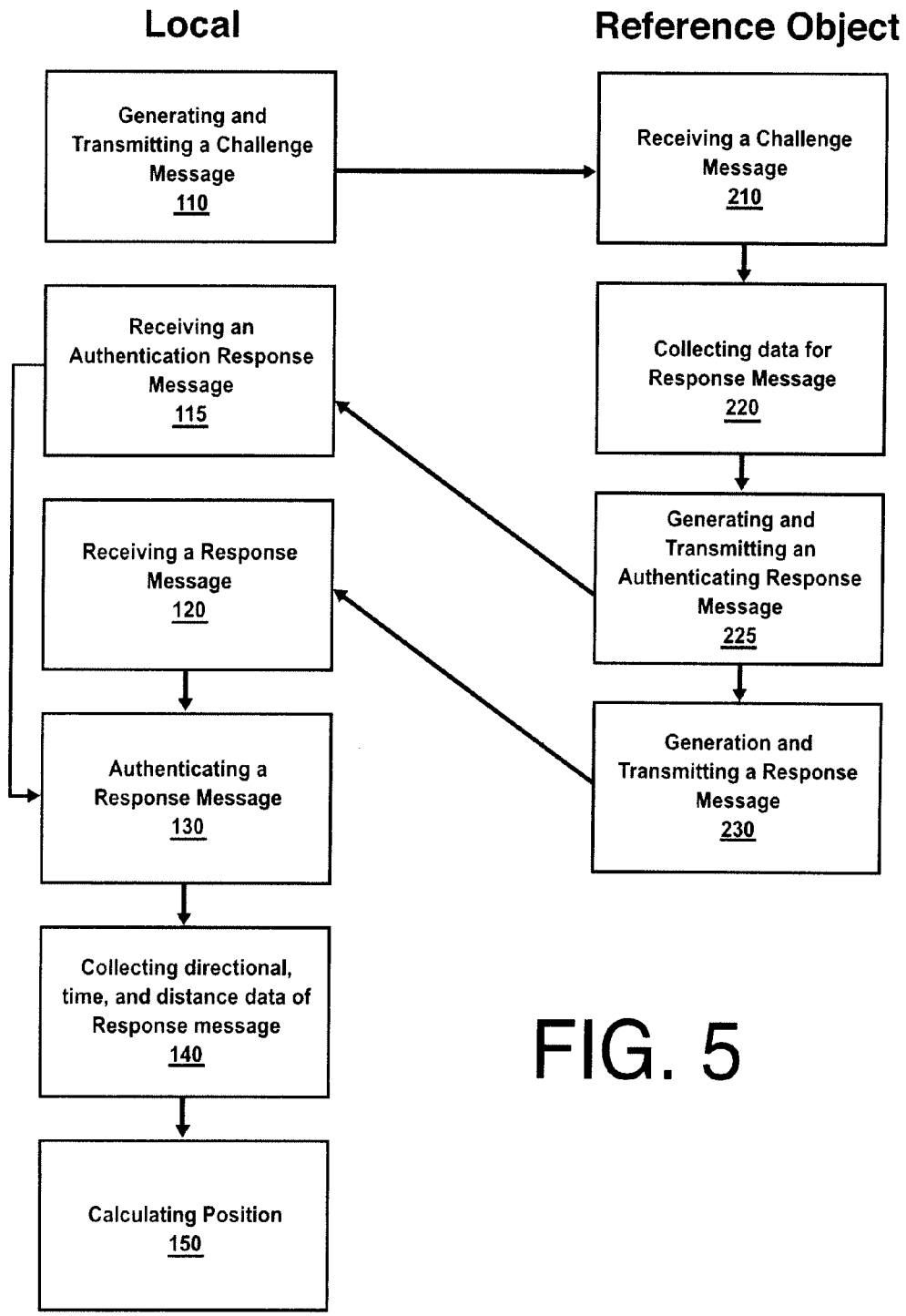
FIG. 5 is another exemplary flow diagram of a method in accordance with an arrangement of the invention.

Similarly, as shown in FIG. 5, the reference object 5 can transmit an authentication response message and at least one second response message. In such an arrangement, either prior to preparing data or once the data is collected (step 220), the reference object 5 sends an authentication response message (step 225). The authentication response message is received by the local object 1 (step 125). As before, such an arrangement allows a reference object 5 to send the required authentication and/or decryption information at the beginning of an exchange of challenge messages 6 and response messages 7, without having to resend the information throughout the length of the exchange. Such an arrangement decreases delay time between challenge messages 6 and response messages 7, allowing for increased accuracy in determining position. The reference object 5 then sends at least one other response message 7 (step 230) which is authenticated and decrypted by the local object 1 (steps 120, 130). However, if the response message 7 cannot be authenticated according to the authentication response message, the response message 7 is rejected by the local object 1. Otherwise, the local object 1 processes the response message 7, as discussed above in FIG. 1, and calculates its position (steps 120-150).

In some arrangements, the challenge messages 6 and the response messages 7 may also be rejected based on directionality. In arrangements in which the transmission transducer system 3 or the reception transducer system 4 is used, the directional information of the local object 1 and the reference object 5 may be used to reject messages. In some arrangements, if the processor 2 of the local object 1 determines, based on the directionality information of the local object 1 and the directionality information provided by the reference object 7, that the directionality calculated by the processor 2 and the directionality reported by the reference object 5 are not directed in substantially opposite directions, a response message 7 would be rejected, even if the response message 7 can be properly authenticated. In other arrangements, where both the transmission transducer system 3 and the reception transducer system 4 are directional, a local object 1 can also reject an authenticated response message as invalid if the directions of transmission and receipt are arrangements are illustrated in FIG. 6.

Figure 6:
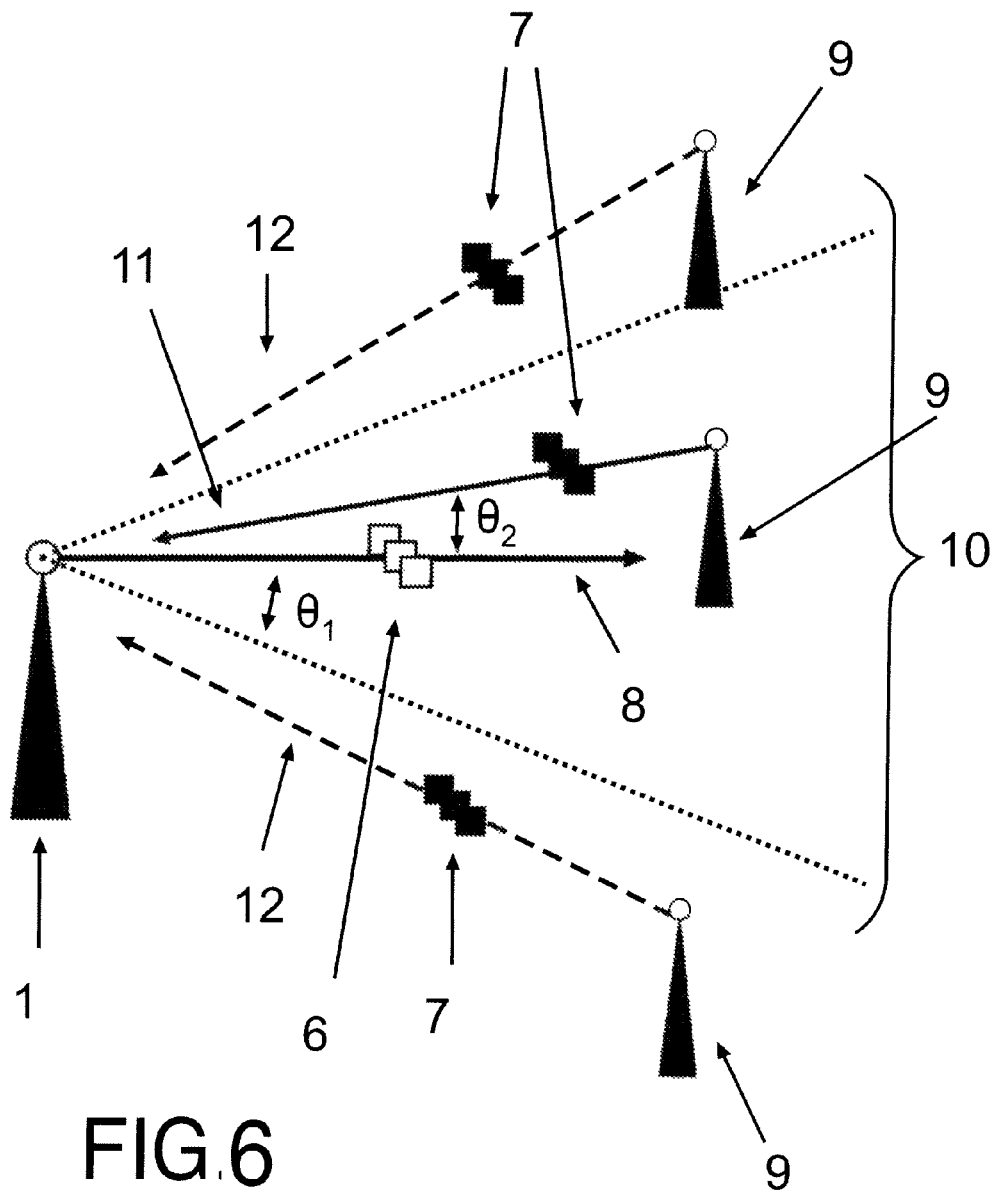
FIG. 6 is another illustration of allowed message acceptance of received messages in accordance with an arrangement of the invention.

In FIG. 6, a local object 1 can transmit a challenge message 6 in a transmission direction 8. One or more reference objects 9 would then transmit back response messages 7 to the local object 1. In a first arrangement, only response messages 7 received from a direction within a predetermined bound ($\pm\theta_1$) would be accepted. An example would be the response message 7 received from a direction 11 with a heading within an amount $\theta_1$ from the direction of heading of the transmission direction 8. Response messages 7 received from directions 12 outside the bound 10, would be rejected, even if properly authenticated. In a second arrangement, the difference $\theta_2$ between the transmission direction 8 and a response message direction 11 would be calculated. Only if $\theta_2$ is within a selected amount, in this case, close to 0 degrees, would the response message 7 be accepted. The particular selected amount can be a pre-determined value or can be dynamic. In the various arrangements, the direction of transmission 8 and the response message directions 11, 12 could be determined from information gathered from a directional transducer of the local object 1 and/or by combining such information with directional information provided in a response message 7. It can be appreciated that in such arrangements a local object 1 can increase calculated position accuracy by calculating position from reference object 9 specifically targeted by a directional transducer and rejecting response messages 7 due to remote or irrelevant reference objects.

In some arrangements, the method provides for subsequent transmission of the position of the local object 1 to a recipient (step 160, FIGS. 2, 3). Such an arrangement is advantageous if the local object 1 wishes to report its position to a specific recipient, such as an air traffic controller or other central location keeping track of the position of the local object 1.

In other arrangements, further security is provided by generating and transmitting a mask signal along with the challenge message 6. Such an arrangement prevents challenge messages 6 from being received from outside the directional transmission pattern of the transmission transducer system from receiving side lobes of the transmission pattern.

It can be appreciated that in the various arrangements, the methods of the invention are not limited to those described in FIGS. 2-6. Furthermore, the methods described in FIGS. 2-6 can be combined to increase security of messages or to increase accuracy in determining position of a local object 1.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

An embodiment in accordance with the present invention will now be described. In an active-client system that makes use of modulated signal response time, a client transmits a signal pattern; the navaid returns a signal pattern as soon as possible. By way of example and not limitation, a client can be a local object and the navaid can be a reference object. Subtracting the processing delay and multiplying by the wave speed gives the distance between the two transmitters. The navaid for this method can also be passive, such as for example and not limitation, marine radar reflectors and the ground features used by terrain-matching radar.

Both interrogation and response messages can be authenticated, thus making meaconing the only substantial vulnerability. Briefly, meaconing is the reception and rebroadcast of legitimate navigation/time signals. Spatially redirecting or precisely delaying signals in a navigation system can lead a victim receiver to an incorrect indication of position. Since meaconing does not require attackers to predict signal content, it cannot be prevented by merely authenticating the navigation bitstream. The meaconing threat is discussed further below. As the method of the present embodiment is not client-passive, it needs transmission security if low observability is an objective. Frequency hopping and direct-sequence spreading can be used to achieve transmission security.

In interactive protocols, time intervals must be measured with nanosecond precision, so decoupling the key exchange from the timing critical segment is actually crucial.

An embodiment of the present invention utilizes an active-time-of flight navigation, pre-authenticated protocol. When designing a public service, there is a need to use asymmetric cryptography. Time-based navigation protocols need to happen literally at the speed of light, but asymmetric algorithms are decidedly less quick, especially considering that to avoid timing attacks on private keys there is a need to fix the time for each operation at its worst-case value. Since fixed protocol-induced delays can be subtracted from the message timing used to measure distance, delay error is a matter of how far the platforms can move during the delay rather than how far signals can travel.

When two nodes with no prior knowledge of their relative position and velocity are moving together at 1000 meters per second, for example, there should be no more than 1 meter of positioning error, so 1 millisecond is the maximum message verification time. Running two verifications and a signature for a reasonably-secure digital signature algorithm takes several milliseconds on modern general-purpose microprocessors.

However, microsecond-level timing is only crucial within the actual message exchange. It is sufficient for participants to know not where they are right now, but where they were a few milliseconds ago. The long-term secure digital signature can be decoupled from the timed message via the following protocol.

In the pre-authenticated protocol, the protocol participants agree on a key and symmetric encryption algorithm, and authenticate each other. Each participant generates a random bit sequence. The test messages in this protocol are encrypted with the agreed-upon symmetric algorithm.

More particularly, the client sends an interrogation message, including the client's random string, $r_c$, and timestamp, t. The navaid decrypts each incoming packet with each of the key/cipher pairs that are valid in its area. By way of example and not limitation, the client can be a local object 1 and the navaid can be a reference object 5 as depicted in FIG. 1. Any message that some valid key does not decrypt to a valid interrogation or reply is dropped. If the timestamp is current and the navaid has not received that $r_c$ before, the navaid immediately responds with a response message that includes the client's random string, $r_c$, and the navaid's random string, $r_n$.

The client measures the precise time from the beginning of its transmission to the end of the navaid's response. For each valid decryption, it subtracts processing delay to get the round-trip signal time of flight and, therefore, the distance to the navaid.

The navaid's transmission of the client's newly generated, unpredictable $r_c$ demonstrates that the navaid received the client's transmission before the client received the navaid's response. Thus, no meaconer can claim that the difference between the client and navaid is less than it actually is. All-station meaconing will not work against this protocol as long as one navaid above the number necessary to fix 3D position is within range.

Note that for many key applications, an attacker being able to increase the measured distance is a critical safety problem. Key applications include without limitation: landing guidance, mid-air traffic avoidance, and radar telemetry. A secure collision-avoidance protocol should, therefore, either require at least three non-collinear nodes or use transmission security.

In might be useful in some situations for nodes to determine distance without pre-arranging keys. An embodiment of the present invention utilizes an active-time-of flight navigation, post-authenticated protocol. In essence, the pre-authenticated protocol previously described is run without encryption, then the response is authenticated afterwards. This loses authentication of interrogations; that could be restored with a pre-authentication method, but then this protocol loses any advantage it might have over its pre-authenticated counterpart.

In the post-authenticated protocol, the client sends an interrogation message that includes the client's random string, $r_c$, and time stamp, t. The navaid sends a response message that includes the client's random string, $r_c$, and the navaid's random string, $r_n$. By way of example and not limitation, the client can be a local object 1 and the navaid can be a reference object 5 as depicted in FIG. 1. Then the navaid sends the client an authentication message, which is preferably a signed, public-key-encrypted message containing $r_c$, $r_n$, its identity, and everything it knew about its position and radiation pattern when it sent its response. The authentication message can include: the navaid's position, p, at time t; the navaid's antenna direction, d, at time t; the interrogation timestamp, t; the navaid's identifier, i; the client's random string, $r_c$; the navaid's random string, $r_n$; and a signature of the forgoing, $S_k$ (...). Since third parties cannot influence or predict $r_c$ or $r_n$, the signed message demonstrates that the navaid generated its response after it received the interrogation.

This invention can be embodied in other forms without departing from the spirit or essential attributes thereof. Accordingly, reference should be made to the following claims, rather than to the foregoing specification, as indicating the scope of the invention.

What is claimed is:

1. A method for determining position relative to an object, the method comprising:
   transmitting at least one challenge message using a transmission transducer system to said object;
   receiving at least one response message using a reception transducer system, wherein said at least one response message comprises a direction of transmission by said transmission transducer system, a time of transmission of said at least one response message, and a time of receipt of said at least one challenge message;
   determining whether said response message is received from a direction within a predetermined angular bound;
   accepting the response message if it is within the bound;
   cryptographically verifying the response message and accepting it if it is cryptographically valid;
   determining a time difference between the challenge message transmission and the response message receipt and accepting the response message if it is within a predetermined time frame;
   rejecting the response message if it is not within the angular bound or not within the predetermined time frame or cryptographically invalid; and determining the object position with improved security and accuracy by a narrowed angle of the reception,
   further comprising transmitting cryptographically authenticated information about the object's position after completing determination of the object's position.

2. The method of claim 1, wherein the predetermined narrow angular bound is provided by the reception transducer system configuration.

3. The method of claim 1, wherein the object performs cryptographic verification of the challenge message and transmits the response message only in case when the challenge message is valid.

4. The method of claim 1, wherein the information about the object's position is encrypted.

5. The method of claim 1, wherein the transmission comprises radio waves.

6. The method of claim 1, wherein the transmission comprises optical waves.

7. The method of claim 1, further comprising: wherein the transmission comprises acoustic waves.

8. The method of claim 1, further comprising: transmitting a masking signal, wherein at least one receiver outside a directional transmission pattern of said transmission transducer system is prevented from receiving side lobes of said directional transmission pattern.

9. The method of claim 1, wherein the directionality of the reception transducer system or said transmission transducer system is provided by an electronically-aimed antenna array scanning in a random or pseudorandom direction pattern.

10. The method of claim 1, further comprising determining a relative position with respect to a plurality of different objects.

11. The method of claim 1, wherein said at least one challenge message or said at least one response message is transmitted as a pulse pattern by a primary radar system.

12. The method of claim 1, wherein the predetermined narrow angular bound is provided by the transmission transducer system configuration.

13. A navigation system for determining a position relative to an object, the system comprising:
a transmission transducer to transmit at least one challenge message;
a reception transducer to receive at least one response message, wherein the response message includes, a direction of said transmission transducer, a time of transmission of said at least one response message, and a time of receipt of said at least one challenge message;
and a microprocessor configured to determine whether said response message is received from a direction within a predetermined angular bound;
the microprocessor configured to accept the response message if it is within the bound;
the microprocessor cryptographically verifying the response message and accepting it if it is cryptographically valid;
the microprocessor configured to determine a time difference between the challenge message transmission and the response message receipt and accepting the response message if it is within a predetermined time frame;
the microprocessor configured to reject the response message if it is not within the angular bound or not within the predetermined time frame or cryptographically invalid;
and the microprocessor configured to provide the object position with improved security and accuracy,
and the microprocessor further configured to transmit cryptographically authenticated information about the object's position after completing determination of the object's position.

14. The system of claim 13, further comprising: a primary radar system, wherein said at least one challenge message or said at least one response message is transmitted as a pulse pattern by said primary radar system.

15. The system of claim 13, wherein said at least one challenge message or said at least one response has direct sequence spread spectrum format.

16. A non-transitory computer readable program embodied in an article of manufacture, comprising computer readable program instructions for determining a position relative to an object, said program comprising:
program instructions for causing a computer to determine whether encoded information is cryptographically derived from at least one challenge message and whether authentication information was sent by said object;
program instructions for causing said computer to determine a time differential between a time of transmission of said at least one challenge message and a time of receipt of at least one response message;
program instructions for causing said computer to determine an adjusted time measurement by subtracting a processing delay time from said time differential;
program instructions for causing said computer to determine a maximum distance to said object based at least in part on one or more of said adjusted time measurement, a speed of propagation of said at least one challenge message and a speed of propagation of said at least one response message;
program instructions for causing a computer to determine at least one of a direction of transmission of said at least one challenge message and a direction of receipt of said at least one response message;
program instructions for causing a computer to determine whether said response message is received from a direction within a predetermined angular bound and to accept the response message if it is within the bound and
program instructions for causing a computer to determine the position relative to said object based at least in part on said maximum distance to said object and at least one of said direction of transmission of said at least one challenge message and said direction of receipt of said at least one response message,
and further comprising program instructions for transmitting cryptographically authenticated information about the object's position after completing determination of the object's position.

17. The program of claim 16, wherein said at least one response message comprises encoded information or authentication information, wherein said authentication information comprises at least one of an identity of said object, a response message content, a position of said object, a direction of a transmission transducer, a gain pattern of said transmission transducer, a gain of transmission of said at least one response message, and a time of receipt of said at least one challenge message.

\* \* \* \* \*